United States Patent
Zimmermann et al.

(10) Patent No.: US 12,424,011 B1
(45) Date of Patent: Sep. 23, 2025

(54) LOCAL VERIFICATION OF AN IDENTITY DOCUMENT BASED ON OPTICAL PATTERN RECOGNITION

(71) Applicant: Scandit AG, Zurich (CH)

(72) Inventors: Moritz Zimmermann, Zürich (CH);
Oliver Akermann, Zürich (CH);
Christian Kündig, Zürich (CH)

(73) Assignee: Scandit AG, Zurich (CH)

( * ) Notice: Subject to any disclaimer, the term of this patent is extended or adjusted under 35 U.S.C. 154(b) by 281 days.

(21) Appl. No.: 18/153,150

(22) Filed: Jan. 11, 2023

Related U.S. Application Data

(63) Continuation of application No. 17/710,519, filed on Mar. 31, 2022, now Pat. No. 11,557,136.

(60) Provisional application No. 63/312,981, filed on Feb. 23, 2022.

(51) Int. Cl.
| | |
|---|---|
| *G06V 30/19* | (2022.01) |
| *G06F 21/62* | (2013.01) |
| *G06V 30/224* | (2022.01) |
| *G06V 30/414* | (2022.01) |
| *G06V 30/42* | (2022.01) |

(52) U.S. Cl.
CPC ...... *G06V 30/1916* (2022.01); *G06F 21/6254* (2013.01); *G06V 30/2247* (2022.01); *G06V 30/414* (2022.01); *G06V 30/42* (2022.01)

(58) Field of Classification Search
CPC .......... G06V 30/1916; G06V 30/2247; G06V 30/414; G06V 30/42; G06F 21/6254
See application file for complete search history.

(56) References Cited

U.S. PATENT DOCUMENTS

| | | |
|---|---|---|
| 4,167,756 A | 9/1979 | Smith |
| D344,261 S | 2/1994 | Watanabe |
| 5,744,815 A | 4/1998 | Gurevich et al. |
| D473,872 S | 4/2003 | Ausems et al. |
| 6,580,453 B1 | 6/2003 | Hirasawa |
| D576,197 S | 9/2008 | Takagi |
| 7,457,407 B2 | 11/2008 | Sun et al. |
| D654,931 S | 2/2012 | Lemelman et al. |
| D658,174 S | 4/2012 | Tasselli et al. |
| D659,564 S | 5/2012 | Baxter |
| 8,223,203 B2 | 7/2012 | Ohsumi et al. |
| D667,823 S | 9/2012 | Merenda |
| D670,278 S | 11/2012 | Hamann |
| D672,386 S | 12/2012 | Matunuma et al. |

(Continued)

FOREIGN PATENT DOCUMENTS

| | | |
|---|---|---|
| EP | 3167404 A1 | 5/2017 |
| JP | 2004032507 A | 1/2004 |

(Continued)

OTHER PUBLICATIONS

"AAMVA DL/ID Card Design Standard" Personal Identification—AAMVA North American Standard, AAMVA, retrieved from: http://www.aamva.org/getmedia/99ac7057-0f4d-4461-b0a2-3a5632e1b35c/AAMVA-2020-DLID-Card-Design-Standard.pdf, Oct. 2020, 125 pages.

(Continued)

*Primary Examiner* — Ming Y Hon
(74) *Attorney, Agent, or Firm* — Kilpatrick Townsend & Stockton LLP

(57) ABSTRACT

An identity document can be authenticated using format data of a barcode on the document, such as a barcode on a driver's license.

20 Claims, 7 Drawing Sheets

(56) References Cited

U.S. PATENT DOCUMENTS

| | | |
|---|---|---|
| D678,870 S | 3/2013 | Fathollahi |
| D678,936 S | 3/2013 | Oliver |
| D685,360 S | 7/2013 | Chen et al. |
| D688,654 S | 8/2013 | Stevinson |
| 8,596,540 B2 | 12/2013 | Adelmann |
| D698,772 S | 2/2014 | Merenda |
| D710,343 S | 8/2014 | Chandler, Jr. et al. |
| D710,346 S | 8/2014 | Smith et al. |
| 8,798,453 B2 | 8/2014 | Lawton |
| D716,285 S | 10/2014 | Chaney et al. |
| D716,785 S | 11/2014 | White |
| D717,287 S | 11/2014 | Macrina et al. |
| D717,304 S | 11/2014 | Yturralde et al. |
| D719,166 S | 12/2014 | Brown et al. |
| D719,167 S | 12/2014 | Brown et al. |
| D724,573 S | 3/2015 | Stevinson |
| D726,701 S | 4/2015 | Stevinson |
| 9,019,420 B2 | 4/2015 | Hurst et al. |
| D728,551 S | 5/2015 | Saeki et al. |
| D732,011 S | 6/2015 | Stevinson |
| D733,112 S | 6/2015 | Chaney et al. |
| D734,336 S | 7/2015 | Mistkawi et al. |
| D744,470 S | 12/2015 | Stevinson |
| D748,085 S | 1/2016 | Merenda |
| D754,114 S | 4/2016 | Curtis et al. |
| D754,650 S | 4/2016 | Curtis et al. |
| D759,004 S | 6/2016 | Stevinson |
| D760,209 S | 6/2016 | Weng et al. |
| D760,212 S | 6/2016 | Mao et al. |
| D760,710 S | 7/2016 | Ozolins et al. |
| D761,240 S | 7/2016 | Ozolins et al. |
| D768,617 S | 10/2016 | Merenda |
| D771,631 S | 11/2016 | Fitch et al. |
| 9,654,675 B2 | 5/2017 | Kessler |
| 9,836,635 B2 | 12/2017 | Negro et al. |
| 10,191,242 B2 | 1/2019 | Palmeri |
| 10,200,599 B1 | 2/2019 | Baldwin |
| 10,229,301 B2 | 3/2019 | Cumoli et al. |
| D860,180 S | 9/2019 | Lehmann et al. |
| D862,441 S | 10/2019 | Eppler et al. |
| 10,426,442 B1 | 10/2019 | Schnorr |
| 10,452,959 B1 | 10/2019 | Gautam et al. |
| 10,818,014 B2 | 10/2020 | Xu et al. |
| 10,846,561 B1 | 11/2020 | Floerkemeier et al. |
| 10,963,658 B1 | 3/2021 | Bloch et al. |
| 11,087,105 B1 | 8/2021 | Biasini et al. |
| 11,216,628 B2 | 1/2022 | Scherly et al. |
| 11,244,147 B2 | 2/2022 | Floerkemeier et al. |
| 11,328,147 B1* | 5/2022 | Ahmed ............... G06V 30/224 |
| 11,332,782 B2* | 5/2022 | Martineau ............... C12N 9/12 |
| 11,557,136 B1* | 1/2023 | Zimmermann ........ G06V 20/63 |
| 2003/0059124 A1 | 3/2003 | Center, Jr. |
| 2004/0250142 A1 | 12/2004 | Feyler |
| 2006/0011724 A1 | 1/2006 | Joseph et al. |
| 2006/0249581 A1 | 11/2006 | Smith |
| 2007/0116454 A1 | 5/2007 | Tsai |
| 2009/0002797 A1 | 1/2009 | Kwong et al. |
| 2009/0033786 A1 | 2/2009 | Finkelstein et al. |
| 2009/0108071 A1 | 4/2009 | Carlson |
| 2009/0212113 A1 | 8/2009 | Chiu et al. |
| 2009/0240715 A1* | 9/2009 | Ito .......................... G06Q 10/10 |
| 2009/0304234 A1 | 12/2009 | Kondo et al. |
| 2010/0102129 A1 | 4/2010 | Drzymala et al. |
| 2010/0328420 A1 | 12/2010 | Roman |
| 2011/0007205 A1 | 1/2011 | Lee |
| 2011/0043683 A1 | 2/2011 | Beach et al. |
| 2011/0081946 A1 | 4/2011 | Singh |
| 2011/0168776 A1 | 7/2011 | Jalali et al. |
| 2012/0024948 A1 | 2/2012 | Messina |
| 2012/0086963 A1* | 4/2012 | Fujitsuka ............... G06Q 10/10 |
| | | 358/1.11 |
| 2013/0076697 A1 | 3/2013 | Goertz et al. |
| 2013/0112750 A1 | 5/2013 | Negro et al. |
| 2013/0206839 A1 | 8/2013 | Gao |
| 2013/0329115 A1 | 12/2013 | Palmeri |
| 2014/0025973 A1 | 1/2014 | Schillings et al. |
| 2014/0168468 A1 | 6/2014 | Levoy et al. |
| 2014/0171150 A1 | 6/2014 | Hurst et al. |
| 2014/0232930 A1 | 8/2014 | Anderson |
| 2014/0285913 A1 | 9/2014 | Palmeri |
| 2014/0327815 A1 | 11/2014 | Auger |
| 2014/0363057 A1* | 12/2014 | Eckel ..................... G06F 21/32 |
| | | 382/116 |
| 2015/0048167 A1 | 2/2015 | Russell et al. |
| 2015/0053765 A1 | 2/2015 | Powell et al. |
| 2015/0116547 A1 | 4/2015 | Laroia |
| 2015/0220766 A1 | 8/2015 | Russell et al. |
| 2016/0042315 A1 | 2/2016 | Field-Darragh et al. |
| 2016/0070944 A1 | 3/2016 | McCloskey et al. |
| 2016/0077307 A1 | 3/2016 | Palmeri |
| 2016/0104021 A1 | 4/2016 | Negro et al. |
| 2016/0104041 A1* | 4/2016 | Bowers .................. G07D 7/12 |
| | | 382/115 |
| 2016/0125680 A1* | 5/2016 | White ..................... G06K 7/00 |
| | | 235/380 |
| 2016/0171707 A1 | 6/2016 | Schwartz |
| 2016/0188941 A1 | 6/2016 | Todeschini et al. |
| 2016/0253599 A1 | 9/2016 | Lang et al. |
| 2016/0307006 A1 | 10/2016 | Wang |
| 2016/0321819 A1 | 11/2016 | Morgan-Mar et al. |
| 2016/0323508 A1 | 11/2016 | Ayalasomayajula et al. |
| 2017/0013179 A1 | 1/2017 | Kang et al. |
| 2017/0032311 A1 | 2/2017 | Rizzolo et al. |
| 2017/0041540 A1 | 2/2017 | Foster et al. |
| 2017/0200247 A1* | 7/2017 | Kuklinski ........ G06K 19/06037 |
| 2017/0243097 A1 | 8/2017 | Loy et al. |
| 2018/0033020 A1* | 2/2018 | Viens .................. G06Q 30/0185 |
| 2018/0053312 A1* | 2/2018 | Ross ....................... G06T 7/248 |
| 2018/0081417 A1 | 3/2018 | Chan et al. |
| 2018/0122194 A1 | 5/2018 | Schoner |
| 2018/0137319 A1 | 5/2018 | Giordano et al. |
| 2018/0157885 A1 | 6/2018 | Gurzumar |
| 2018/0342050 A1 | 11/2018 | Fitzgerald et al. |
| 2019/0188435 A1 | 6/2019 | Davis et al. |
| 2019/0213523 A1 | 7/2019 | Adato et al. |
| 2019/0244043 A1 | 8/2019 | Bradley et al. |
| 2019/0325183 A1 | 10/2019 | Tscherepanow et al. |
| 2020/0042803 A1 | 2/2020 | Yamaguchi |
| 2020/0084375 A1 | 3/2020 | Tadano et al. |
| 2020/0250766 A1* | 8/2020 | Sancheti ................ G06V 10/22 |
| 2020/0320648 A1 | 10/2020 | Passolt |
| 2021/0125141 A1 | 4/2021 | Lipsey et al. |
| 2021/0150618 A1 | 5/2021 | Glaser et al. |
| 2021/0158278 A1 | 5/2021 | Bogolea et al. |
| 2021/0165862 A1* | 6/2021 | Agrawal ............. G06F 16/2379 |
| 2021/0182863 A1* | 6/2021 | Doraiswamy .......... G06Q 20/02 |
| 2021/0192162 A1 | 6/2021 | Rodriguez et al. |
| 2021/0224623 A1* | 7/2021 | Deng ....................... H04N 1/6077 |
| 2021/0233203 A1* | 7/2021 | Ross ......................... G06F 18/22 |
| 2022/0019780 A1* | 1/2022 | Ozserin ............... G06K 7/10722 |
| 2022/0050890 A1* | 2/2022 | Karantzis ............. G06V 30/153 |
| 2022/0067737 A1* | 3/2022 | Wittenbach ........ G06Q 20/4016 |

FOREIGN PATENT DOCUMENTS

| | | |
|---|---|---|
| KR | 20020077090 A | 10/2002 |
| KR | 20060102957 A | 9/2006 |
| WO | 0131893 A1 | 5/2001 |
| WO | 2016007662 A1 | 1/2016 |
| WO | 2019135163 A2 | 7/2019 |

OTHER PUBLICATIONS

"Code Reader 4405 User Manual", Code Product Line Version 03, Release date: Jan. 2016,. Code Corporation, Accessed on: Dec. 22, 2020 [Online]. Retrieved from: https://web.archive.org/web/20181223184651/http://www.codecorp.com/products.php?id=167, 16 pages.

"Flens—The First Flashlight Booster for Smartphones", created by Basilico, Kickstarter, last updated Dec. 11, 2019, Accessed on Mar. 26, 2021 from https://kickstarter.com/projects/basilico/flen-the-first-flashlight-booster-for-smartphones, 26 pages.

(56) References Cited

OTHER PUBLICATIONS

"Linea Pro Extreme Rugged Case". Infinite Peripherals, iOS Accessories, Linea Pro and Infinea Tab Accessories, Retrieved on Dec. 22, 2020 from https://web.archive.org/web/20150825044354/http://ipcprint.com/linea-pro-extreme-rugged-case.html 3 page.

"Classify structured data with feature columns", TensorFlow Core, TesnorFlow>Learn>TensorFlorwCore>Tutorials, retrieved from: www.tensorflow.org/tutorials/structured_data/feature_columns, Apr. 22, 2022, 14 pages.

"Driver License and Identification Cards" Pennsylvania Depart of Transportation, PUB 802 Jul. 2017, retrieved from: https://www.dot.state.pa.us/public/dvspubsforms/BDL/BDL%20Publications/PUB%20802.pdf, Apr. 22, 2022, pages.

Brownlee; Jason, "Deep Learning Models for Human Activity Recognition", Deep Learning for Time Series, Navigation, last updated Aug. 5, 2019, 16 pages.

Stecanella; Rodrigo, "The Beginner's Guide to Text Vectorization", Blog, MonlyLearn, Sep. 21, 2017, 9 pages.

Scandit, "Scandit Augmented Reality Retail Price Label Verification", posted Sep. 26, 2018, retrieved on Aug. 4, 2020 from https://www.scandit.com/resources/videos/scandit-augmented-reality-retail-price-label-verification/ , 5 pages.

Scandit, "Scandit Augmented Reality for Smart Devices", posted Oct. 2, 2019, retrieved on Dec. 2, 2020 from https://www.scandit.com/resources/videos/scandit-augmented-reality-for-smart-devices/, 3 pages.

Scandit, "Scandit Augmented Retail Product Information Using AR", posted Sep. 26, 2018, retrieved on Dec. 2, 2020 from https://www.scandit.com/resources/videos/scandit-augmented-retail-product-information-using-ar/, 5 pages.

Scandit, "Scandit Augmented Reality Retail Click and Collect", posted Sep. 26, 2018, retrieved on Dec. 2, 2020 from https://www.scandit.com/resources/videos/scandit-augmented-reality-retail-click-and-collect/, 4 pages.

Scandit, "Scandit Augmented Reality Retail Shelf Management", posted Sep. 26, 2018, retrieved on Dec. 2, 2020 from https://www.scandit.com/resources/videos/scandit-augmented-reality-retail-shelf-management/, 4 pages.

Scandit, "Computer Vision and Augmented Reality for Enterprise Applications", posted Jun. 6, 2018, retrieved on Dec. 2, 2020 from https://www.scandit.com/resources/videos/computer-vision-and-augmented-reality-for-enterprise-applications/, 2 pages.

Invitation to Pay Additional Fees And, Where Applicable, Protest Fee, mailed Jun. 17, 2021 in International Patent Application No. PCT/US2021/025212, 2 pages.

International Application No. PCT/US2021/025212 received an International Search Report and the Written Opinion mailed Aug. 12, 2001, 11 pages.

U.S. Appl. No. 17/396,123 received a Non-Final Office Action, mailed on Dec. 2, 2021, 6 pages.

U.S. Appl. No. 17/468,376 received a Notice of Allowance, mailed on Nov. 29, 2021, 14 pages.

U.S. Appl. No. 16/920,061 received a Pre-Interview First Office Action mailed on Sep. 16, 2020, 6 pages.

U.S. Appl. No. 16/920,061 received a Notice of Allowance mailed on Dec. 2, 2020, 10 pages.

Pre-Interview First Office Action mailed on Sep. 16, 2020 in U.S. Appl. No. 16/920,061 6 pages.

Notice of Allowance mailed Aug. 5, 2020 in U.S. Appl. No. 16/905,722, 19 pages.

Notice of Allowance mailed Dec. 2, 2020 in U.S. Appl. No. 16/920,061, 14 pages.

\* cited by examiner

LOCAL VERIFICATION OF AN IDENTITY DOCUMENT BASED ON OPTICAL PATTERN RECOGNITION

CROSS-REFERENCE TO RELATED APPLICATIONS

This application is a continuation of U.S. Non-Provisional patent application Ser. No. 17/710,519, filed on Mar. 31, 2022, entitled "Identity Document Verification Based On Barcode Structure," which claims priority to U.S. Provisional Patent Application No. 63/312,981, filed on Feb. 23, 2022, entitled "Identity Document Verification Based On Barcode Structure," the disclosures of which are incorporated by reference in their entirety for all purposes.

BACKGROUND

This disclosure relates in general to a camera in a mobile device. More specifically, and without limitation, this disclosure relates to decoding barcodes in a scene or image using the camera in the mobile device. Barcodes have traditionally been scanned using a specialized scanner. For example, a barcode scanner comprising a laser is used to shine light on a barcode, and reflected light from the barcode is detected and used to decode the barcode. As mobile devices (e.g., smartphones and tablets) with cameras have become more common, mobile devices are being used to decode codes by acquiring an image of a code and using image analysis to decode the code. An example of a method for using as smartphone to decode a barcode is provided in U.S. Pat. No. 8,596,540, granted on Dec. 3, 2013.

BRIEF SUMMARY

This disclosure relates to barcode scanning, and more specifically, and without limitation, to verifying an identity document (ID) using a structure of an optical code on the ID.

In certain embodiments, a system for authenticating an identity document (ID), such as a government-issued ID, comprises a camera and one or more processors. The camera can be part of a mobile device, such as a smartphone. The one or more processors are configured to: receive scan data, wherein: the scan data is obtained by decoding a plurality of barcodes, each barcode of the plurality of barcodes is on a separate identification card, such that scan data is from a plurality of identification cards; extract format features of the plurality of barcodes, corresponding to how barcode information is structured, from the scan data; classify, using the scan data, the plurality of barcodes into two or more clusters, wherein each cluster is characterized by a set of format features extracted from the plurality of barcodes; receive barcode data, wherein: the barcode data is obtained by decoding a barcode that is not part of the plurality of barcodes, the barcode that is not part of the plurality of barcodes is decoded based acquiring an image of the barcode with the camera, the barcode data comprises payload data and format data, the barcode is on an identification card presented by a person to be authenticated; parse the barcode data to identify the format data; compare the format data of the barcode data to format features of at least one of the two or more clusters; and/or predict validity of the identification card presented, based on comparing the format data of the barcode data to format features of at least one of the two or more clusters.

In some embodiments, the scan data is anonymized data, such that personal information has been removed; each cluster of the two or more clusters is characterized by a cluster feature vector comprising parameters of features; the plurality of identification cards are issued driver licenses; and/or comparing the format data of the barcode data to format features of at least one of the two or more clusters comprises creating a feature vector based on barcode structure.

In certain embodiments, a method for authenticating an ID comprises: receiving scan data, wherein the scan data is obtained by decoding a plurality of barcodes, each barcode of the plurality of barcodes is on a separate identification card, such that scan data is from a plurality of identification cards; extracting format features of the plurality of barcodes, corresponding to how barcode information is structured, from the scan data; classifying, using the scan data, the plurality of barcodes into two or more clusters, wherein each cluster is characterized by a set of format features extracted from the plurality of barcodes; receiving barcode data, wherein the barcode data is obtained by decoding a barcode that is not part of the plurality of barcodes, the barcode data comprises payload data and format data, and the barcode is on an identification card presented by a person to be authenticated; parsing the barcode data to identify the format data; comparing the format data of the barcode data to format features of at least one of the two or more clusters; and/or predicting validity of the identification card presented, based on comparing the format data of the barcode data to format features of at least one of the two or more clusters.

In some embodiments, the method further comprises predicting that the identification card presented is invalid based on comparing the format data of the barcode data to format features of at least one of the two or more clusters; initiating a request to a remote identification verification service by transmitting at least a portion of the barcode data to the remote identification verification service, based on predicting the identification card presented is invalid; receiving a result from the remote identification verification service; authenticating the identification card presented based on the result from the remote identification verification service; revising data from the plurality of barcodes to remove personally-identifiable information; and/or scanning the plurality of barcodes using one or more image barcode scanners. In some embodiments, the plurality of identification cards are issued driver licenses; a cluster of the two or more clusters corresponds to a geographical jurisdiction; the cluster corresponds to a date of issue of identity documents; extracting format features comprises creating a feature vector based on barcode structure; the plurality of identification cards are issued by one or more government agencies, to a plurality of individuals before the plurality of barcodes were decoded; and/or each cluster of the two or more clusters is characterized by a cluster feature vector comprising parameters of features.

In certain embodiments, a method for authenticating an ID comprises receiving barcode data, wherein the barcode data is obtained by decoding a barcode, the barcode data comprises payload data and format data, and/or the barcode is on an identification card presented by a person to be authenticated; comparing the format data of the barcode data to format features of at least one of two or more clusters, wherein each cluster is characterized by a set of format features corresponding to how barcode information is structured for the cluster; predicting that the identification card presented is invalid based on comparing the format data of the barcode data to format features of at least one of the two or more clusters; initiating a request to a remote identification verification service by transmitting at least a portion of the barcode data to the remote identification verification service, after predicting that the identification card presented is invalid; receiving a result from the remote identification verification service; and/or authenticating the identification card presented based on the result from the remote identification verification service. In some embodiments, the method further comprises receiving scan data, wherein: the scan data is obtained by decoding a plurality of barcodes, each barcode of the plurality of barcodes is on a separate identification card, such that scan data is from a plurality of identification cards, and the barcode data obtained of the barcode on the identification card presented by the person to be authenticated is not part of the scan data; extracting format features of the plurality of barcodes, corresponding to how barcode information is structured, from the scan data; and/or classifying, using the scan data, the plurality of barcodes into two or more clusters. In some embodiments, the at least a portion of the barcode data sent to the remote identification verification service includes at least a portion of the payload data; comparing the format data of the barcode data to format features of at least one of the two or more clusters is performed locally; and/or the at least a portion of the barcode data is transmitted to the remote identification verification service over the Internet.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Examples of optical patterns include 1D barcodes, 2D barcodes, numbers, letters, and symbols. As scanning optical patterns is moved to mobile devices, there exists a need to increase scanning speed, increase accuracy, and/or manage processing power. Interpreting an optical pattern (e.g., scanning for an optical pattern) can be divided into two steps: detecting and decoding. In the detecting step, a position of an optical pattern within an image is identified and/or a boundary of the optical pattern is ascertained. In the decoding step, the optical pattern is decoded (e.g., to provide a character string, such as a numerical string, a letter string, or an alphanumerical string). As optical patterns, such as barcodes and QR codes, are used in many areas (e.g., shipping, retail, warehousing, travel), there exists a need for quicker scanning of optical patterns. In some embodiments, optical patterns can include alpha and/or numerical characters. The following are techniques that can increase the speed, accuracy, and/or efficiency of scanning for optical patterns. The following techniques can be used individually, in combination with each other, and/or in combination with other techniques.

Figure 1:
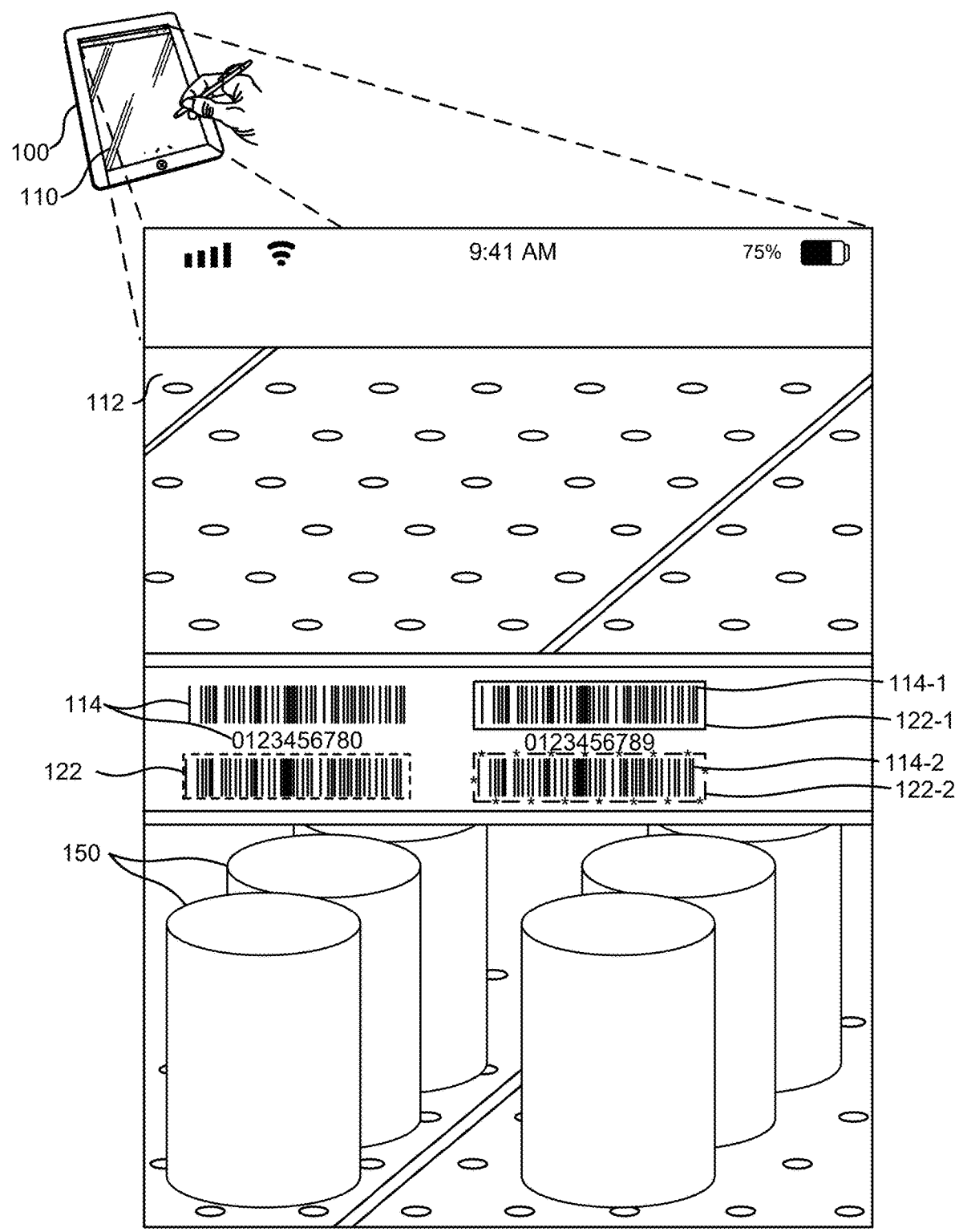
FIG. 1 depicts an example technique for automated recognition and decoding of a pattern in an image containing multiple patterns, in accordance with some embodiments.

FIG. 1 depicts an example technique for automated detection and decoding of one or more optical patterns in an image, in accordance with some embodiments. In FIG. 1, a system 100 (e.g., a mobile device) comprises a display 110 and a camera. The camera has a field of view (FOV) of a real scene. The camera is configured to capture an image 112 of the real scene. The real scene contains one or more optical patterns 114.

The camera can capture a plurality of images. The plurality of images can be presented in "real time" on the display 110 (e.g., presented on the display 110 in a sequential manner following capture, albeit potentially with some latency introduced by system processes). The image 112 is one of the plurality of images. The plurality of images depict the real world scene as viewed through the field of view of the camera. The real world scene may include multiple objects 150, patterns, or other elements (e.g., faces, images, colors, etc.) of which the optical patterns 114 are only a part. FIG. 1 depicts a first optical pattern 114-1 and a second optical pattern 114-2, among other optical patterns 114.

The image 112 may be captured by the camera and/or provided via additional or alternative system processes (e.g., from a memory device, a communications connection to an online content network, etc.). The optical patterns 114 are detected and/or recognized in the image 112. Detection and recognition of optical patterns may describe different approaches for image analysis of optical patterns. Detection may describe detecting an optical pattern in an image by characteristic discrete patterns (e.g., parallel bars or symbols). Recognition may include additional analysis of the pattern that provides descriptive and/or characteristic information (e.g., an optical pattern type), specific to the optical pattern, but does not necessarily include decoding the optical pattern. For example, a barcode may be detected in an image based on image analysis revealing a region of the image containing multiple parallel bars. After additional analysis, the barcode may be recognized as a UPC code. In some embodiments, detection and recognition are concurrent steps implemented by the same image analysis process, and as such are not distinguishable. In some embodiments, image analysis of optical patterns proceeds from detection to decoding, without recognition of the optical pattern. For example, in some embodiments, an approach can be used to detect a pattern of characters, and in a second step decode the characters with optical character recognition (OCR).

Detecting optical patterns 114 permits automatic (e.g., without user interaction) generation and/or presentation on the display 110 of one or more graphical elements 122. In some embodiments, the graphical elements 122 may include, but are not limited to highlighted regions, boundary lines, bounding boxes, dynamic elements, or other graphical elements, overlaid on the image 112 to emphasize or otherwise indicate the positions of the optical patterns 114 in the plurality of images. Each optical pattern 114 may be presented with one or more graphical elements, such that a user is presented the positions of the optical patterns 114 as well as other metadata, including but not limited to pattern category, decoding status, or information encoded by the optical patterns 114.

The system 100 may identify one or more of the optical patterns 114 for decoding. As mentioned above, the decoding may be automated, initializing upon detection of an optical pattern 114 and successful implementation of a decoding routine. Subsequent to detection and/or decoding, object identifier information, optical pattern status, or other information to facilitate the processing of the optical patterns 114 may be included by a graphical element 122 associated with an optical pattern 114 that is decoded. For example, a first graphical element 122-1, associated with the first optical pattern 114-1, may be generated and/or presented via the display 110 at various stages of optical pattern detection and/or decoding. For example, after recognition, the first graphical element 122-1 may include information about an optical pattern template category or the number of patterns detected. Following decoding, the first graphical element 122-1 may present information specific to the first optical pattern 114-1. For an optical pattern 114 that is detected, but decoding is unsuccessful, the system 100 may alter a graphical element 122 to indicate decoding failure, as well as other information indicative of a source of the error. As an illustrative example, a second graphical element 122-2 may indicate that the second optical pattern 144-2 cannot be decoded by the system 100, for example, through dynamic graphical elements or textual information. For example, the second graphical element 122-2 is a yellow box surrounding the second optical pattern 114-2 after the second optical pattern 114-2 is detected; the second graphical element 122-2 is changed to a red box if the second optical pattern 114-2 is not decoded, or is changed to a green box if the second optical pattern 114-2 is decoded. Examples of graphical elements used during detecting and decoding optical patterns can be found in U.S. application Ser. No. 16/905,722, filed on Jun. 18, 2020, which is incorporated by reference for all purposes. Optical patterns can also be tracked, as described in U.S. patent application Ser. No. 16/920,061, filed on Jul. 2, 2020, which is incorporated by reference for all purposes.

Identity Document

Figure 2:
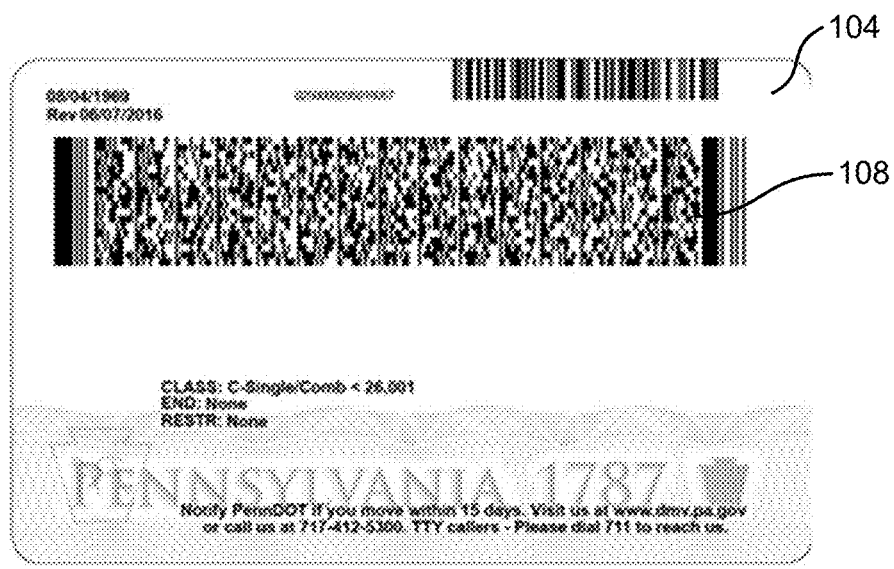
FIG. 2 depicts an embodiment of a government-issued identity document.

Referring first to FIG. 2, an image of an embodiment of an identity document (ID) 204 is shown. The ID 204 is a sample US driver's license from Pennsylvania (available at: www.dot.state.pa.us/public/dvspubsforms/BDL/BDL %20Publications/PUB %20802.pdf, last accessed Mar. 30, 2022). The image is of the back of the ID. The ID 204 comprises a barcode 208. US driver licenses contain a barcode on the back of the card with data encoded in a machine-readable form. Currently, a PDF417 barcode is used, and data of the cardholder is encoded according to the 2020 DL/ID Card Design Standard of the American Association of Motor Vehicle Administrators (AAMVA), available at: www.aamva.org/assets/best-practices-guidance/dl-id-card-design-standard (last accessed Mar. 30, 2022).

Validating Identity Document Using Barcode Structure

Though the AAMVA provides a standard, different jurisdictions implement the standard in very different ways (both within the standard and sometimes violating the standard). A parser is configured to analyze and identify data encoded using the AAMVA standard, wherein the parser can handle different exceptions, which can occur depending on the ID issuer and/or card version.

When authenticating a person (e.g., for a purchase of an age restricted good such as alcohol), the barcode of the ID can be read and used to identify the person. In general, the operator of the scanner (e.g., using a barcode scanner or a smartphone), would then manually verify the authenticity of the document. As manufacturers of fake IDs often don't accurately replicate the details of the barcode, some embodiments are used to verify an ID in an automated way based on the barcode.

Structure of data encoded in a barcode can be used to verify an ID (e.g., in a PDF417 barcode on the back of a US driver license). This verification can be done as part of a stand-alone solution that receives data from a barcode scanner or as part of an integrated solution that includes a barcode scanner and/or other verification features such as a database lookup in an AAMVA Driver's License Data Verification (DLDV) Service.

Some potential advantages, in some embodiments, include one or more of the following: more accurate and/or efficient data capture (e.g., front of the card does not need to be scanned with OCR); the system can work offline (e.g., without an internet connect; no dependency on a live database to check details of the data); and/or the implementation is less complex compared to other options such as verifying security features with computer vision.

While the barcode on a driver's license encodes data according to the standard set by the AAMVA, the standard leaves variations in interpretation and/or flexibility on how the data is encoded. For example, order of fields is not fixed; there is overlapping meaning between fields (e.g., First/LastName vs FullName); only a small subset of fields are mandatory; and multiple versions of the standard (1-10) exist. Generally, different states encode data in different ways (and different amounts of data), which can also change as a state updates its systems through the years. Since these differences are hard to observe and aren't publicly documented, many barcode generators for fake IDs follow their own structure. This makes it possible to detect these IDs as fake.

In some configurations, barcode structure is compared against official templates. However, official templates are not publically available. In some configurations (e.g., when official templates are not available), large amounts of barcode data are analyzed (e.g., with a presumption that the vast majority of barcodes are not fake) and clustered (e.g., automatically) into groups of similarly structured IDs. For a particular ID to be checked, structure of the barcode is measured to ascertain whether the structure of the barcode matches a group or cluster of IDs with similar metadata (e.g., issuing jurisdiction, version, issuing date, etc.). In some embodiments a cluster corresponds to a geographical jurisdiction and/or version (e.g., version is based on date of issue).

Though a driver license is used as an example of an ID, other types of documents could be used (e.g., passport, passport card, name badge, military ID, permanent resident card, certificate of citizenship, certificate of naturalization, etc.). Though a barcode is used as an example of an optical pattern to be decoded, in some embodiments, other optical patterns (e.g., on an ID) are decoded and/or compared to a format (e.g., text, symbols, numbers, etc.) in addition to, or in lieu or, analyzing a barcode.

Figure 3:
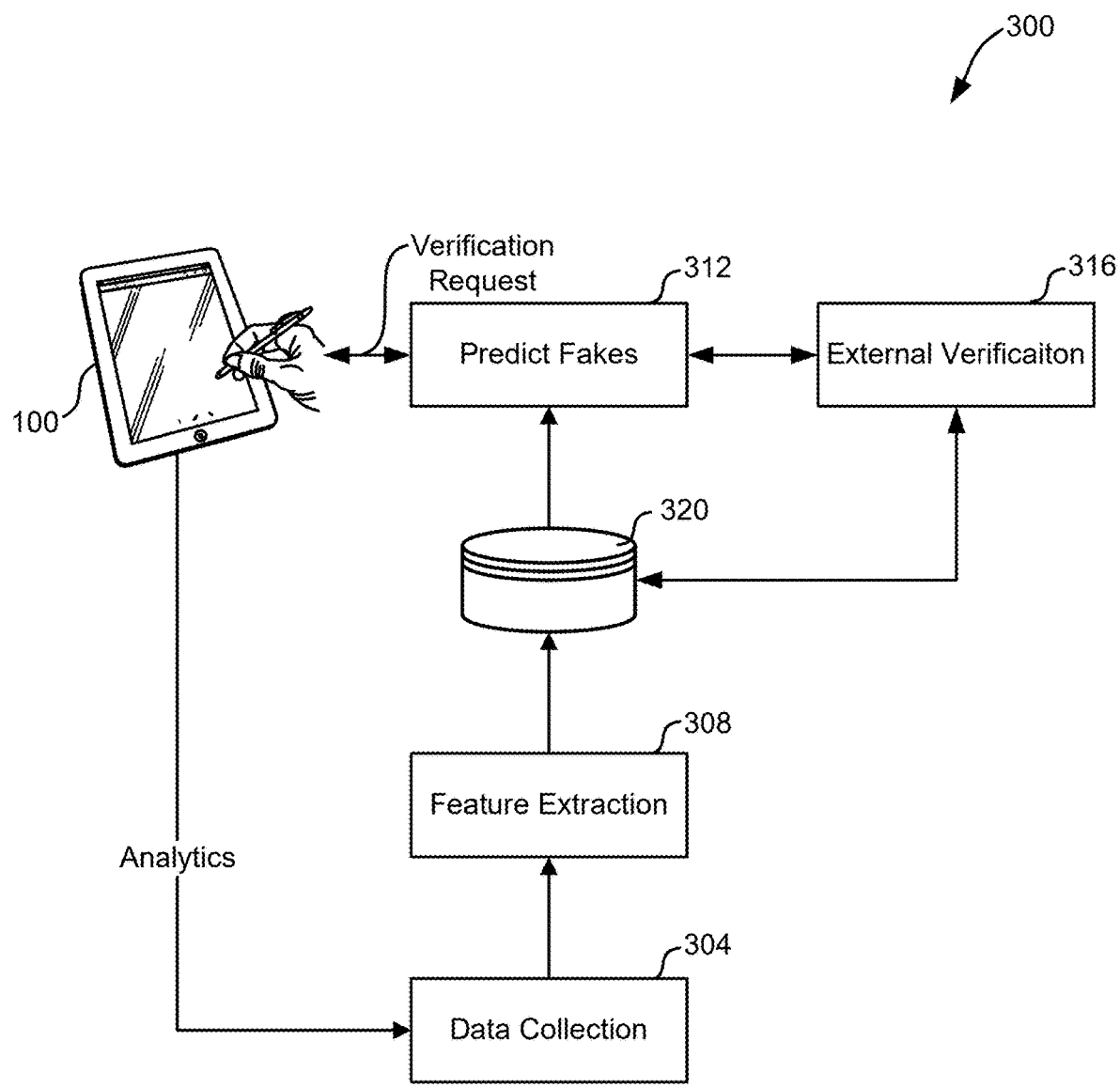
FIG. 3 depicts a flow diagram of an embodiment of a process for validating an identity document.

FIG. 3 depicts an embodiment of a method 300 for validating an ID. Some embodiments use each step of method 300. Some embodiments use a subset of steps of method 300. In step 304, data is collected. In step 308, features are extracted. In step 312, an ID is predicted to be valid or not valid. In step 316, external verification is used and/or performance observations are used.

Data Collection

Data from a plurality of barcodes is collected, step 304. In some embodiments, a large number of known identity documents are used. In some embodiments, a large number of identity documents are used and the validity of each document is unknown, with an assumption that a clear majority of documents are valid. In some embodiments, a combination of known identity documents and unknown identity documents are used.

Storing personal identifiable information (PII). It is often not feasible or desirable to store personal identifiable information. In some embodiments, the system includes a step to remove PII and keep anonymized "feature" vectors of the IDs collected. For example, payload data, data that is specific to an individual, can be replaced with a generic symbol, such as "xxxxxx".

The system can collect data in various ways. For example, data can be collected as part of analytics transmitted for ID scans, without ID verification; and/or data can be collected to perform ID verification.

Feature Extraction

During feature extraction, step 308, a barcode format is represented with an anonymous feature vector. A feature vector of barcode format can be list comprising data about features of the barcode. For example, to compare different driving license barcodes with one another and to build a database of known barcode formats, a representation is developed. In some embodiments, the representation achieves one or more of the following goals: represents variations in formats, such as presence and order of fields, field separators, date, and/or measurement formats; does not represent variations specific to an owner of an ID; fields with privacy critical data are anonymized, for example document discriminator, name, date of birth, and address are removed; keeps fields that have a limited set of allowable data, or which allow to discriminate fakes, for example issue date (could be outside of document life time), vehicle class, restriction codes, compliance indicators.

To represent raw data and/or format, a number of meta-data based features can be created. These are added to the feature vector to account for characteristics of fake IDs that are observable when taking multiple fields into account, or which use additional know-how of the AAMVA specification. Examples include representation of AAMVA version, jurisdiction version, issuing state, issuing year, and/or document type; features based on the AAMVA specification, such as correctness of header and/or subfile designator, presence of data fields, presence of sub-files, length and/or format of subfiles; features based on jurisdiction-specific format, such as presence and/or order of data fields (including absence of a data field), format of dates, weight, and/or height, line breaks, carriage returns, and/or record returns, leading and/or trailing whitespace, duration between issue and expiry date; and/or features based on barcode characteristics, such as PDF417 error correction levels.

In some embodiments, features such as units are used. For example, one jurisdiction and/or cluster may use centimeters for height, another inches, and another feet and inches. Fields can be selected based on statistical analysis. In some embodiments, a number of lines used for a field can be used to compare formats. For example, some clusters use four lines for an address and some clusters use five lines for an address. A feature in the feature vector can be number of lines for an address. Features are extracted from a barcode of a document to be verified by searching for inconsistencies.

Feature vectors (e.g., for an individual, a group, and/or a cluster) can be saved in a database 320. The database 320 can be a remote database or part of a device used for scanning barcodes. The database 320 in FIG. 3 can represent one or more physical databases.

Fake Prediction

Anonymized feature vectors are used to perform supervised or unsupervised classification. The classifier predicts, step 312, the likelihood that a given driver's license is fake (e.g., based on the database of known feature vectors). One or more predictors can be used for predicting a fake ID.

In some embodiments, feature likelihood classification is used. Steps for feature likelihood classification can comprise one or more of the following steps: extract anonymous features from a large number of existing driver licenses; for each cluster, generate distribution of known features; given a new driver license, extract features and compute the likelihood for each individual value, given the distribution of other samples from the same cluster; use a weighted cost-function based on the individual feature likelihoods and/or other meta-data known to correlate with the legitimacy of IDs (e.g., the owner's age); classify the ID as fake if the accrued cost is higher than a threshold; and/or threshold and cost-function can be fine-tuned in a supervised fashion in order to increase or maximize the accuracy of the model.

In some embodiments, decision tree classification is used. Decision trees are a supervised classification approach that allows mapping categorical data into binary decision trees. A node of the tree is a binary decision based on one of the features. The leaves of the tree are the final classification result (e.g., legit or fake). Steps for decision tree classification can comprise one or more of the following steps: generate a dataset by extracting anonymous features from a large number of existing driver licenses; the individual features take a limited set of values, since variance due to personal information is removed from the features; features with a large number of different values are bucketized and/or embedded to put an upper bound to a number of subtrees, after the category's decision node; with a small set of possible values for each feature, the data is interpreted as categorical data, where each feature represents one category; classify structured data with feature columns (e.g., TensorFlow Core, www.tensorflow.org/tutorials/structured_data/feature_columns); the data is labeled manually or with an external verification service; based on the labeled categorical data, a supervised decision tree model is trained; options include simple decision trees, random forest (RF), and/or regularized gradient boost trees (XGBoost).

In some embodiments, information in a barcode does not account for the order in which fields appear. Therefore, features are augmented by including an original position of a field into the data. For example, if the name (DCT) was stored as a first field, it is represented with 1\nα,α instead of \nα,α. Auditing non-linear classifiers such as RF or XGBoost can be challenging. Therefore, in some embodiments, one or both of the following approaches are used to interpret the performance of decision tree based model: (1) analyze how close the performance of a single decision tree is to a XGBoost or RF classifier; and/or (2) extract the X highest weighted trees from XGBoost or RF and visualize them (in particular nodes close to the root).

In some embodiments, a linear and/or nonlinear regression classifier is used. Support vector machines (SVM), Naive Bayes classifiers (NB), and/or logistic regression (LR) come up with decision rules that are based on a linear combination of the elements of a feature vector. By making use of kernels, this principle can be extended to nonlinear decision rules. Steps for a linear and/or nonlinear regression classifier can comprise one or more of the following steps: generate a dataset by extracting anonymous features from a large number of existing driving licenses; text-based feature vectors are transformed to numeric feature vectors using text vectorization techniques from NLP, such as n-gram, bag of words, and/or word embeddings (e.g., see Beginners Guide to Text Vectorization, https://monkeylearn.com/blog/beginners-guide-text-vectorization/); the data is labeled manually or with an external verification service; based on the labeled dataset, supervised classifiers such as SVM, NB, and/or LR are trained; the classifier returns a binary decision and/or a confidence level of how likely a given sample is fake/legitimate. In some embodiments, new samples may have words which were not part of a sample in the train set. These are represented with a dedicated "unknown"-word. Very common fields might over-shadow less common ones. To counteract this effect, TF-IDF normalization is used. If data is combined, the number of unique words grows tremendously, resulting in sparse feature vectors. In some embodiments, word embedding is used to reduce dimensionality of available words.

In an example, a grocery delivery service is delivering alcohol to a resident. The deliverer should check an ID of the person receiving the grocery items to verify the person receiving the alcohol is old enough to purchase alcohol. If the deliverer does not have an internet connection, has limited internet connection, or does not want to pay a service charge for each alcohol transaction for validation using an external validation service, the deliverer can scan the barcode on the back of the person's driver's license, and the system can check the format of the barcode to predict validation of the person's driver license.

Validation Process

To increase or insure the accuracy of the system, it can, in some embodiments, be connected to external services provided by government or private organizations, step 316. The feedback from these services can be used to supervise and/or improve the predictions (e.g., manually or automatically). To increase or ensure the accuracy of this system, it can, in some embodiments, relearn its predictor based on "known fakes." For verification, known fakes can be added to the samples (e.g., generated with freeware or purchased). User AAMVA verification requests can be used to measure accuracy.

Accuracy verification and model updates. As the product is used, data is collected, which can be used (e.g., automatically) for re-evaluating existing clusters. User feedback can be used to manually flag wrongly classified documents. Third party services can be used to both measure the accuracy as well as update existing clustering methods (e.g., with an external AAMVA Driver License Data Verification service).

In some embodiments, if an ID is predicted as a fake, an external verification service (e.g., an AAMVA Driver License Data Verification Service) is used to confirm the fake. Driver License Data Verification services generally charge a fee per verification request. Predicted fake IDs will occur much less often than predicted valid IDs. By using the system described in steps 304, 308, and 312 FIG. 3, and then using to Driver License Data Verification service to confirm fake IDs (and/or to quality test the system), costs for verification requests through a Driver License Data Verification service can be reduced. And for most verifications, a connection to the Internet is not needed.

Integration

In some embodiments, the verification system can be implemented into a variety of scenarios: The verification system can be used offline/on-device. For example, logic for the validation is integrated into a vendor's system. This works completely offline, but would rely on a manual update for newly issued documents. The verification system can be used online. For example, logic can be performed on a backend-server (e.g., images and/or barcode data is are sent to a back-end server for processing). Models can automatically be updated based on improvements. The verification system can be used online with integration of third-party services. For additional accuracy, it is possible to integrate the verification system with third party services, which can help to double-check ID or a sample of IDs to measure the accuracy of the existing clusters. The verification system can be used with a combination of online and offline. For example, the system could operate on a locally stored validation when a device is offline, and rely on a backend and/or be online for scheduled updates and/or maintenance.

Figure 4:
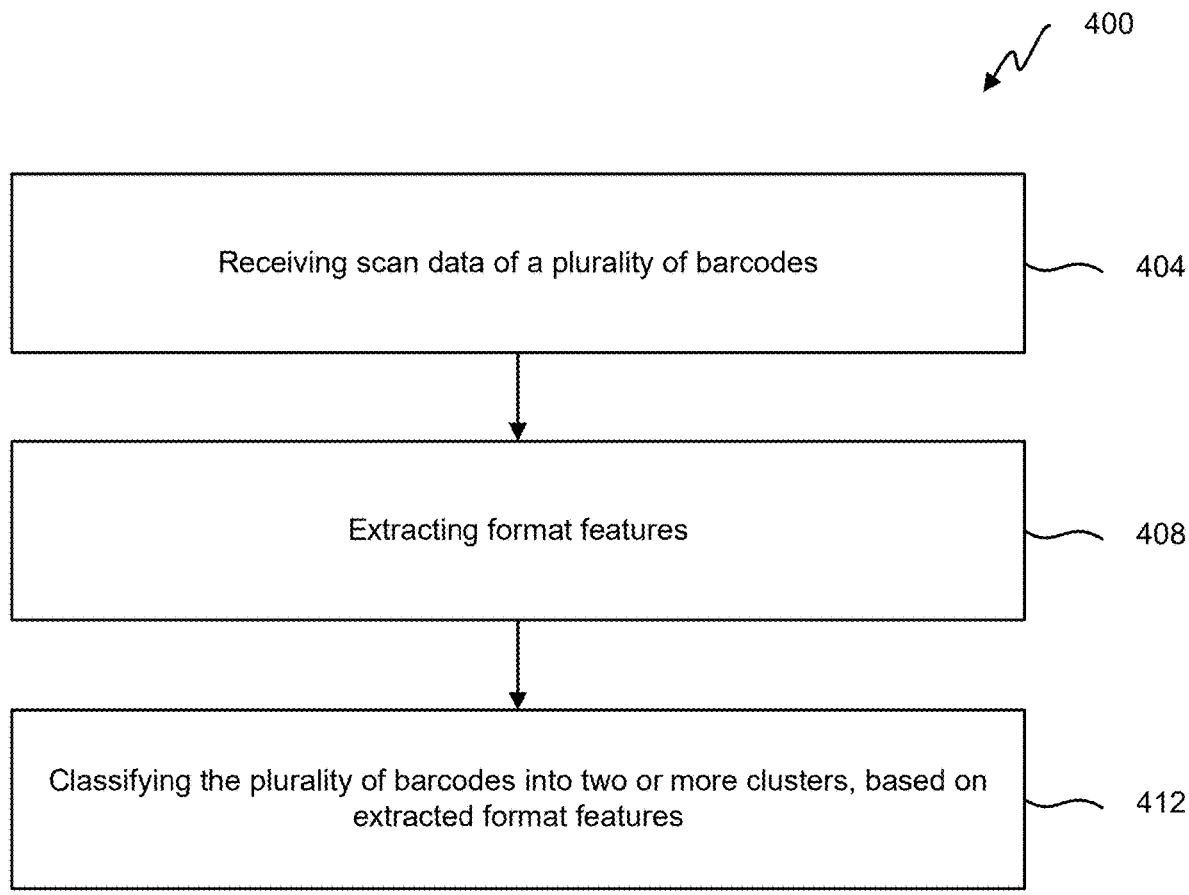
FIG. 4 illustrates a flowchart of an embodiment of a process for building a barcode format database.

FIG. 4 illustrates a flowchart of an embodiment of a process for building a barcode format database. The barcode format database can be used for authenticating an identity document (e.g., a government-issued identity document). Process 400 begins in step 404 with receiving scan data of a plurality of barcodes. The scan data can be obtained by decoding a plurality of barcodes. Each barcode of the plurality of barcodes is on a separate identification document, such that scan data is from a plurality of identification documents. In some embodiments, identification documents are government-issued identification cards (e.g., driver's licenses; photo identification card). Each barcode of the plurality of barcodes is on a separate identification document, such that scan data is from a plurality of identification documents. In some embodiments, the plurality of identification cards are issued, by one or more government agencies (e.g., as driver's licenses), to a plurality of individuals, before the plurality of barcodes are decoded (e.g., the scan data comes from barcodes on issued identification documents; and scanning the barcodes is performed post issuance). For example, a thousand (or more) barcodes on driver's licenses are scanned by parcel-delivery drivers, restaurant employees, convenient-store employees, car-rental employees, event employee etc. in California, while checking proper age of people to receive parcels, enter a store, buy certain products, and/or to participate in an event. Thus, in some embodiments, the scan data does not come from a government or quasi-government source.

Data from the plurality of barcodes is filtered and/or aggregated to form the scan data. For example, data from the plurality of barcodes is acquired (e.g., scanned and/or decoded) by a plurality of mobile devices (e.g., a plurality of systems 100 shown in FIG. 3) and then aggregated. Data from the plurality of barcodes can be filtered by anonymizing the data from the plurality of barcodes (e.g., such that personally-identifiable information is removed from the plurality of barcodes, such as removing name, address, phone number, etc.). Thus, in some embodiments, the method further comprises revising data from the plurality of barcodes to remove personally-identifiable information.

In step 408, format features are extracted from the scan data. The format features correspond to how barcode information is structured. In some embodiments, feature vectors are created based on data from the plurality of barcodes. The feature vectors are based on structures of barcodes.

An example of an embodiment of a feature vector for a cluster is given in Table I below. A feature vector for a cluster comprises a list of feature parameters for the cluster (e.g., state of issuance, date of issue, format feature similarity, etc.). A feature vector of a barcode is compared to the feature vector of the cluster for compliance of the feature vector of the barcode with the feature vector of the cluster.

TABLE I

Example Cluster Feature Vector

| Field | Feature |
|---|---|
| State | Text = "California" |
| | Mandatory = y |
| | Order = 1 |
| Issue Date | Date is equal to or between Jul. 1, 2015 and Jun. 30, 2020 |
| | Mandatory = y |
| | Order = 2 |
| | Format = mm/dd/yyyy |
| Separator | = "/r" |
| Endorsements | Text = "A", "B", "C", "D", "E", "M", or "CDL" |
| | Mandatory = n |
| | Order = 9 |
| Hair | Text = "BLK", "RED", "WHI", "BRO", "GRY", "BLD", or "BAL" |
| | Mandatory = y |
| | Order = 19 |
| Weight | Length = 3 |
| | Units = pounds |
| | Mandatory = y |
| | Order = 16 |
| Height | Format = f'-in" |
| | Mandatory = y |
| | Order = 17 |
| ... | ... |

Various features can be in a feature vector. A feature vector allows many barcodes to be compared and/or to compare a barcode to be validated to a cluster. For example, there are variations in headers. Some jurisdictions separate a header from other fields. There are variations in carriage returns and line breaks. Though "/n" can be typical for some jurisdictions, other jurisdictions use "/r" or "/r/n". Order of fields and presence of fields can be different. For example, some jurisdictions have a separate field for middle name while other jurisdictions combine a first name and a middle name together in a "given name" field. In some jurisdictions, the endorsements field is after height and weight, whereas in other jurisdictions endorsements can be before height and weight. Some fields have a certain number of digits and other do not. For example, a length of a name can vary in the name field, but a date of birth field has a specified number of digits (e.g., mm/dd/yyyy). Some fields have a limited data set. For example, hair color can be limited to "BLK", "RED", "WHI", "BRO", "GRY", "BLD", or "BAL", whereas other jurisdictions may use different abbreviations (e.g., "brn" instead of "BRO" for brown hair). Thus if a barcode used "brn" instead of "BRO" for a certain jurisdiction and/or version of ID, it could raise a red flag that the ID is fake. Some jurisdictions may have only one character for gender and/or only two gender options (e.g., "M" or "F"), whereas other jurisdictions may use lowercase letters, have more than two gender options, and/or more than one character used for gender. Ethnicity and eye color are further examples of fields that can have limited data sets. There can be variations in addresses. For example, one jurisdiction might use three lines for an address, and another jurisdiction might use four or five lines and/or have a zip code as a separate field. Variation in addresses can be high. Some address formats use a hyphen to separate text, some address formats use dots. Some addresses put a house number before a street address; some formats put the house number after the street address. Some formats spell out certain words, whereas other address formats use abbreviations (e.g., "street" versus "str."). Some entries in fields can be limited to certain types of characters (e.g., only numbers and forward slashes in a date field; or only letters in a hair color field). Formats are generally consistent for a given cluster.

Generally, barcode fields are identified by a three letter code (e.g., according to AAMVA format). If a three letter code is not recognized, then that can raise a red flag. If the payload data does not match the expected format of the field, the ID can be predicted to be a fake. The feature vector of a cluster can list mandatory fields, so that if a mandatory field is missing, the ID can be predicted to be a fake. Lengths of fields can be used, and if a length of a field exceeds an expected length, then the ID can be predicted to be a fake.

Applicant has found that there are about 100 to 120 data fields that have been used in licenses. By using data analysis (e.g., big-data analysis) and/or iterative processes, format vectors for clusters be generated. Further, by using big data (e.g., lots of scan data such as 20,000 or 50,000 different licenses), outliers (e.g., fake licenses in the scan data) can be identified and disregarded when classifying clusters. Further, known valid licenses can be used to verify cluster format data.

In some embodiments, rostering is used to identify a header, state, number of different fields, length of different fields, etc. Applicant has found that some jurisdictions are not consistent with formats. Some data does not comply with a jurisdiction's own formatting. For example, a jurisdiction can provide a count of how many fields there are and then not have the stated number of fields. Some counts are off by a set amount. Some states are consistently off by 1 or 10 characters. Some length of fields are consistent in a jurisdiction, but in other jurisdictions lengths of fields can vary. In some embodiments, a format vector for a cluster comprises a list of constraints on format data.

In step 412, the plurality of barcodes, using the scan data, are classified into two or more clusters. Each cluster is characterized by a set of format features (e.g., extracted from the plurality of barcodes). In some embodiments, each cluster is characterized by a feature vector. In some embodiments, a cluster corresponds to a geographical jurisdiction (e.g., a state, providence, country, etc.) and/or version (e.g., date of issue). For example, a first cluster corresponds to driver licenses issued in the state of California from Jul. 1, 2015 to Jun. 30, 2020; a second cluster corresponds to driver licenses issued in the state of California from Jan. 10, 2020 to present; a third cluster corresponds to driver licenses issued in the state of Nevada from Feb. 18, 2018 to present; etc.

Feature extraction can be used for both developing data for a training set and also to validate a specific ID. In some embodiments, supervised training of IDs (e.g., of 50,000, 100,000, or more IDs) is used to generate clusters. In some embodiments, cluster information is saved in a database (e.g., database 320, shown in FIG. 3; and/or saved on device 100).

Figure 5:
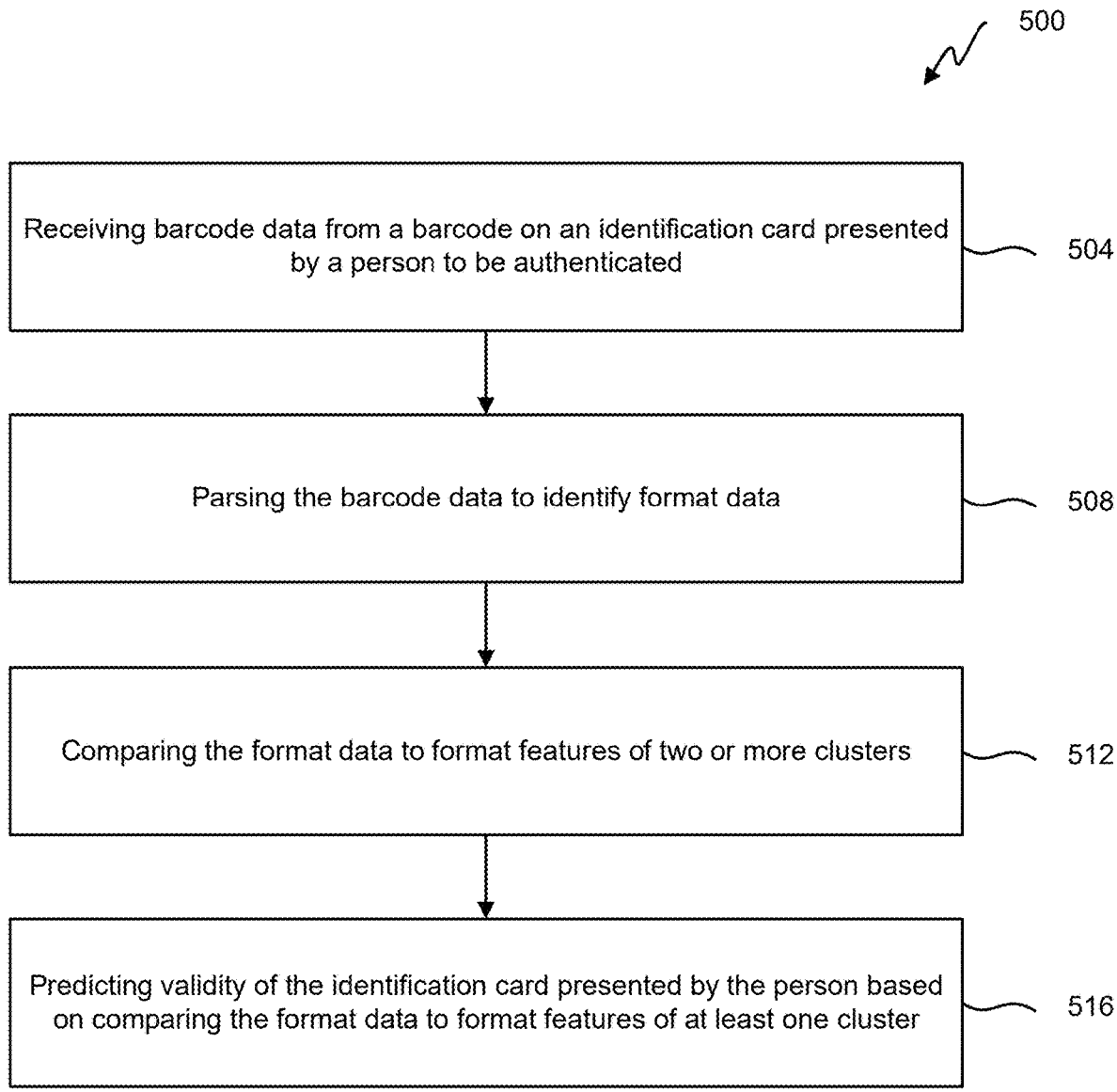
FIG. 5 illustrates a flowchart of an embodiment of a process for authenticating an identity document.

FIG. 5 illustrates a flowchart of an embodiment of a process for authenticating an identity document. In some embodiments, the identity document to be authenticated is not part of the plurality of identity documents used to create scan data (though data from the identity document can be added to the scan data for authenticating another ID). Process 500 begins in step 504 with receiving barcode data. The barcode data can be obtained by decoding a barcode that is not part of the plurality of barcodes discussed in FIG. 4. The barcode data comprises payload data and format data. The barcode is on an identity document presented by a person to be authenticated. For example, the person to be authenticated shows a driver's license to a store employee. The barcode in on the back of the driver's license. The store employee (e.g., using device 100 in FIG. 3), scans the back of the driver's license and decodes the barcode on the driver's license to be authenticated.

In step 508, the barcode data from the identity document to be authenticated is parsed to identify format data. For example, a format vector is generated from the barcode data of the identity document to be authenticated. The format vector can include information such as order of fields, field lengths, etc.

The format data of the barcode data from the identity document to be authenticated is compared to format features of one or more clusters (e.g., the one or more clusters discussed in conjunction with FIG. 4), step 512.

In step 516, a validity of the identification document presented is predicted to be invalid (i.e., a fake), based on comparing the format data of the barcode data to the format features one or more clusters (in some embodiments, format data is compared to at least two or more clusters). If the format features, jurisdiction, and/or issue date of the identification document presented does not match to a cluster, then the identification document presented can be predicted to be invalid. For example, if the document presented is allegedly issued by California, has an issue date of April 2021, but the format features match the cluster corresponding to issued licenses in California from Jul. 1, 2015 to Jun. 30, 2020, then the document presented could be predicted as a fake. In another example, if the format features of the barcode from the document presented fail to match format features of the clusters, then the document presented is predicted to be invalid. The format of a barcode presented can be compared to what the format should look like. If the barcode states the driver's license was issued in a jurisdiction in a given timeframe, then it is compared to the format data of a cluster corresponding to that jurisdiction and timeframe. In some embodiments, a format vector for a cluster comprises a list of constraints of format data. A format vector of data from a barcode on a document to be verified is compared to the format vector of one or more clusters.

In some embodiments, an external authentication service is used if barcode format authentication predicts a document presented is invalid. If there is not enough data to classify a valid driver's license cluster, and a user presents a valid document, the valid document could be predicted to be invalid based on barcode format. For example, if the scan data has limited scan information from driver's licenses issued in Nunavut, Canada, so as to not have a cluster representing Nunavut; a resident from Nunavut is traveling in the United States; and the Nunavut resident presents a valid driver's license for authentication while at a bar in Alabama; then the Nunavut driver's license could be predicted to be invalid based on format comparison because the driver's license presented does not match a format of a known cluster. Thus, in some embodiments, an external authentication service is used when a document is predicted to be invalid. By not using an external authentication service when a document is predicted to be valid by format comparison, time, bandwidth, and/or money can be saved (e.g., an external authentication service usually requires an internet link and a fee per transaction).

Figure 6:
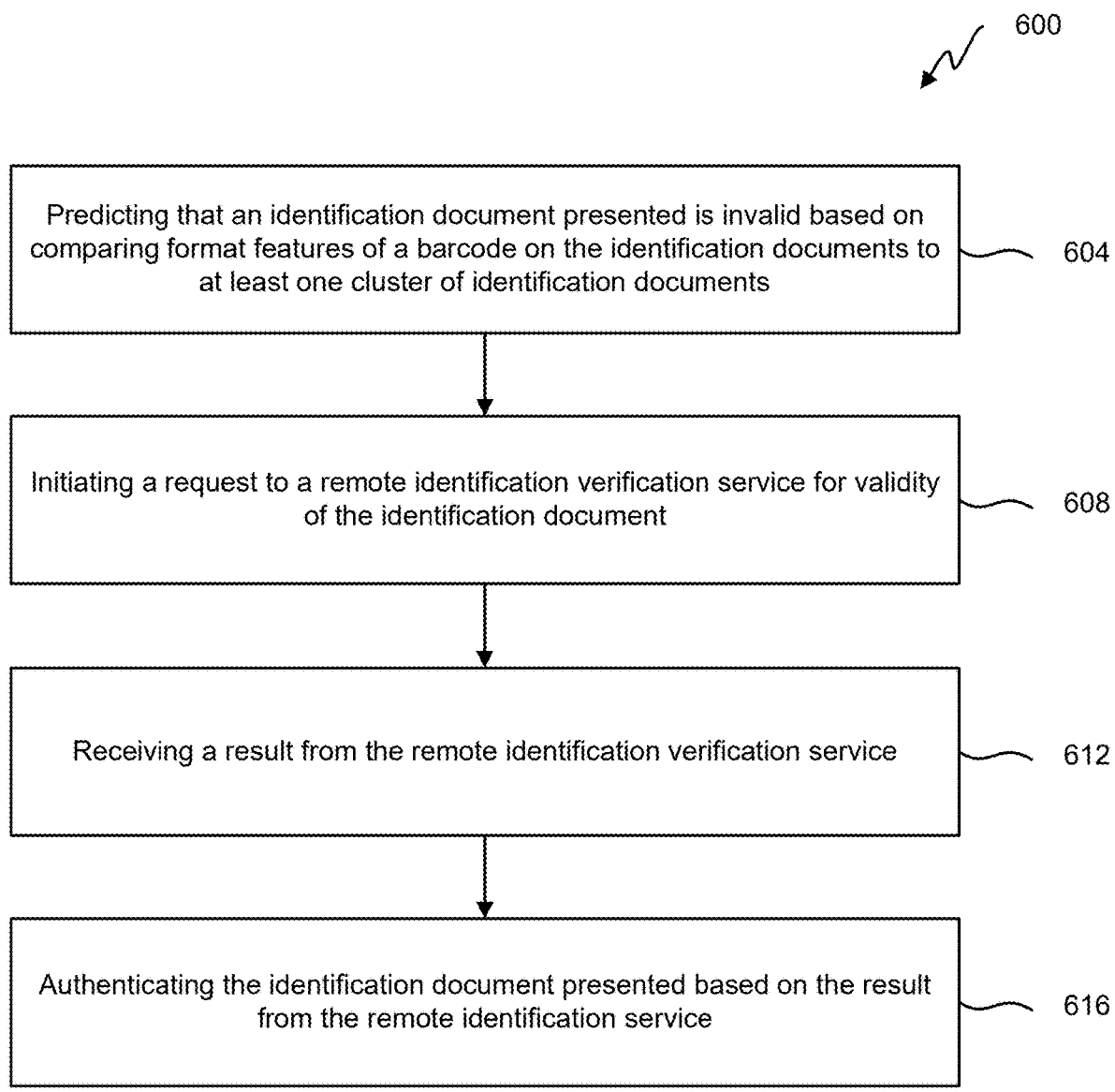
FIG. 6 illustrates a flowchart of an embodiment of a process for using an external authentication service as backup to barcode format authentication.

FIG. 6 illustrates a flowchart of an embodiment of a process for using an external authentication service (e.g., a third-party service) as backup to barcode format authentication. Process 600 begins in step 604 with predicting that an identification document presented is invalid, based on comparing the format data of the barcode data to format features of one or more clusters (e.g., based on step 516 in FIG. 5). In step 608 a request to a remote identification verification service is initiated and at least a portion of the barcode data is transmitted to the remote identification verification service, based on predicting the identification document presented is invalid in step 604.

In step 612 a result from the remote identification verification service received. The result could also be an invalid document. The result could be a valid document. In step, 616, the identification document presented is validated based on the result from the remote identification service returning a valid result. Thus the document is validated even though the format data predicted that the document was invalid.

In some embodiments, the at least a portion of the barcode data sent to the remote identification verification service comprises at least a portion of the payload data from the barcode on the identity document to be verified; comparing format data of the barcode data to format features of at least one of the two or more clusters is performed locally; and/or the at least a portion of the barcode data is transmitted to the remote identification verification service over the Internet.

In some embodiments, a method for authenticating a government-issued identity document using a remote service as backup comprises:
receiving barcode data, wherein:
the barcode data is obtained by decoding a barcode;
the barcode data comprises payload data and format data; and
the barcode is on an identification card presented by a person to be authenticated;
comparing the format data of the barcode data to format features of at least one of two or more clusters, wherein each cluster is characterized by a set of format features corresponding to how barcode information is structured for the cluster;
predicting that the identification card presented is invalid based on comparing the format data of the barcode data to format features of at least one of the two or more clusters;
initiating a request to a remote identification verification service by transmitting at least a portion of the barcode data to the remote identification verification service, after predicting that the identification card presented is invalid;
receiving a result from the remote identification verification service; and authenticating the identification card presented based on the result from the remote identification verification service.

In some embodiments, the method in the preceding paragraph further comprises:

receiving scan data, wherein:
- the scan data is obtained by decoding a plurality of barcodes;
- each barcode of the plurality of barcodes is on a separate identification card, such that scan data is from a plurality of identification cards; and
- the barcode data obtained of the barcode on the identification card presented by the person to be authenticated is not part of the scan data;

extracting format features of the plurality of barcodes, corresponding to how barcode information is structured, from the scan data; and classifying, using the scan data, the plurality of barcodes into two or more clusters.

In some embodiments, the at least a portion of the barcode data sent to the remote identification verification service includes at least a portion of the payload data. In some embodiments, comparing the format data of the barcode data to format features of at least one of the two or more clusters is performed locally, and/or the at least a portion of the barcode data is transmitted to the remote identification verification service over the Internet.

Some embodiments include one or more steps from the process 400 in FIG. 4, from the process 500 in FIG. 5, and/or from the process 600 in FIG. 6.

Figure 7:
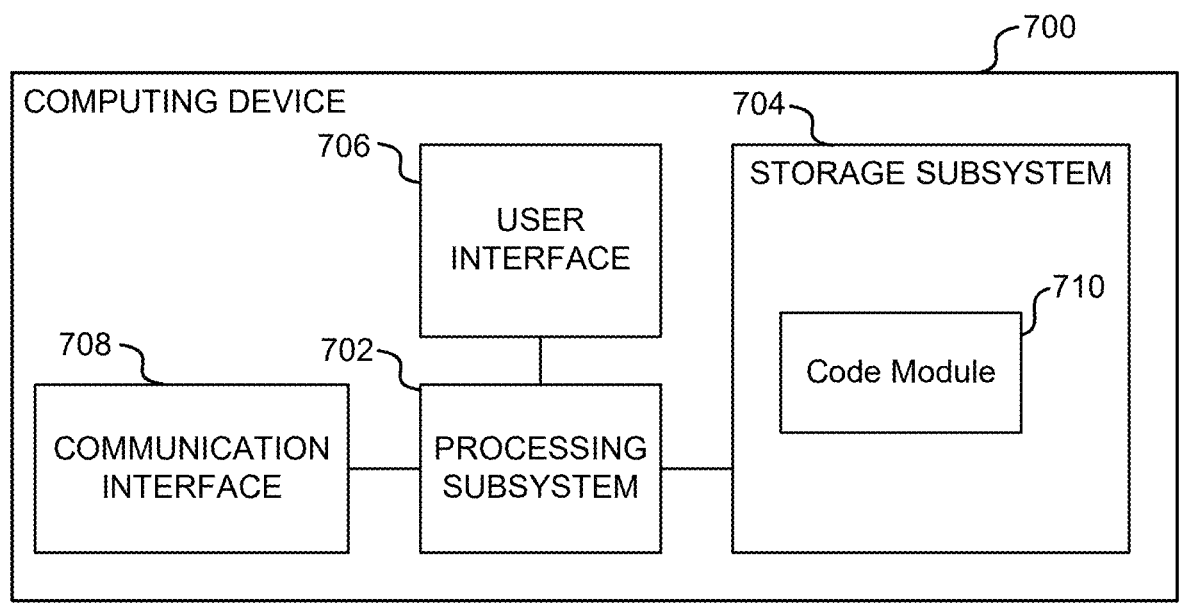
FIG. 7 depicts a block diagram of an embodiment of a computer system.

FIG. 7 is a simplified block diagram of a computing device 700. Computing device 700 can implement some or all functions, behaviors, and/or capabilities described above that would use electronic storage or processing, as well as other functions, behaviors, or capabilities not expressly described. Computing device 700 includes a processing subsystem 702, a storage subsystem 704, a user interface 706, and/or a communication interface 708. Computing device 700 can also include other components (not explicitly shown) such as a battery, power controllers, and other components operable to provide various enhanced capabilities. In various embodiments, computing device 700 can be implemented in a desktop or laptop computer, mobile device (e.g., tablet computer, smart phone, mobile phone), wearable device, media device, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform a function or combination of functions described above.

Storage subsystem 704 can be implemented using a local storage and/or removable storage medium, e.g., using disk, flash memory (e.g., secure digital card, universal serial bus flash drive), or any other non-transitory storage medium, or a combination of media, and can include volatile and/or non-volatile storage media. Local storage can include random access memory (RAM), including dynamic RAM (DRAM), static RAM (SRAM), or battery backed up RAM. In some embodiments, storage subsystem 704 can store one or more applications and/or operating system programs to be executed by processing subsystem 702, including programs to implement some or all operations described above that would be performed using a computer. For example, storage subsystem 704 can store one or more code modules 710 for implementing one or more method steps described above.

A firmware and/or software implementation may be implemented with modules (e.g., procedures, functions, and so on). A machine-readable medium tangibly embodying instructions may be used in implementing methodologies described herein. Code modules 710 (e.g., instructions stored in memory) may be implemented within a processor or external to the processor. As used herein, the term "memory" refers to a type of long term, short term, volatile, nonvolatile, or other storage medium and is not to be limited to any particular type of memory or number of memories or type of media upon which memory is stored.

Moreover, the term "storage medium" or "storage device" may represent one or more memories for storing data, including read only memory (ROM), RAM, magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, program code or code segments to perform tasks may be stored in a machine readable medium such as a storage medium. A code segment (e.g., code module 710) or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted by suitable means including memory sharing, message passing, token passing, network transmission, etc.

Implementation of the techniques, blocks, steps and means described above may be done in various ways. For example, these techniques, blocks, steps and means may be implemented in hardware, software, or a combination thereof. For a hardware implementation, the processing units may be implemented within one or more ASICs, DSPs, DSPDs, PLDs, FPGAs, processors, controllers, micro-controllers, microprocessors, other electronic units designed to perform the functions described above, and/or a combination thereof.

Each code module 710 may comprise sets of instructions (codes) embodied on a computer-readable medium that directs a processor of a computing device 700 to perform corresponding actions. The instructions may be configured to run in sequential order, in parallel (such as under different processing threads), or in a combination thereof. After loading a code module 710 on a general purpose computer system, the general purpose computer is transformed into a special purpose computer system.

Computer programs incorporating various features described herein (e.g., in one or more code modules 710) may be encoded and stored on various computer readable storage media. Computer readable media encoded with the program code may be packaged with a compatible electronic device, or the program code may be provided separately from electronic devices (e.g., via Internet download or as a separately packaged computer-readable storage medium).

Storage subsystem 704 can also store information useful for establishing network connections using the communication interface 708.

User interface 706 can include input devices (e.g., touch pad, touch screen, scroll wheel, click wheel, dial, button, switch, keypad, microphone, etc.), as well as output devices (e.g., video screen, indicator lights, speakers, headphone jacks, virtual- or augmented-reality display, etc.), together with supporting electronics (e.g., digital-to-analog or analog-to-digital converters, signal processors, etc.). A user can operate input devices of user interface 706 to invoke the functionality of computing device 700 and can view and/or hear output from computing device 700 via output devices of user interface 706. For some embodiments, the user interface 706 might not be present (e.g., for a process using an ASIC).

Processing subsystem 702 can be implemented as one or more processors (e.g., integrated circuits, one or more single-core or multi-core microprocessors, microcontrollers, central processing unit, graphics processing unit, etc.). In operation, processing subsystem 702 can control the operation of computing device 700. In some embodiments, processing subsystem 702 can execute a variety of programs in response to program code and can maintain multiple concurrently executing programs or processes. At a given time, some or all of a program code to be executed can reside in processing subsystem 702 and/or in storage media, such as storage subsystem 704. Through programming, processing subsystem 702 can provide various functionality for computing device 700. Processing subsystem 702 can also execute other programs to control other functions of computing device 700, including programs that may be stored in storage subsystem 704.

Communication interface 708 can provide voice and/or data communication capability for computing device 700. In some embodiments, communication interface 708 can include radio frequency (RF) transceiver components for accessing wireless data networks (e.g., Wi-Fi network; 3G, 4G/LTE; etc.), mobile communication technologies, components for short-range wireless communication (e.g., using Bluetooth communication standards, NFC, etc.), other components, or combinations of technologies. In some embodiments, communication interface 708 can provide wired connectivity (e.g., universal serial bus, Ethernet, universal asynchronous receiver/transmitter, etc.) in addition to, or in lieu of, a wireless interface. Communication interface 708 can be implemented using a combination of hardware (e.g., driver circuits, antennas, modulators/demodulators, encoders/decoders, and other analog and/or digital signal processing circuits) and software components. In some embodiments, communication interface 708 can support multiple communication channels concurrently. In some embodiments the communication interface 708 is not used.

It will be appreciated that computing device 700 is illustrative and that variations and modifications are possible. A computing device can have various functionality not specifically described (e.g., voice communication via cellular telephone networks) and can include components appropriate to such functionality.

Further, while the computing device 700 is described with reference to particular blocks, it is to be understood that these blocks are defined for convenience of description and are not intended to imply a particular physical arrangement of component parts. For example, the processing subsystem 702, the storage subsystem, the user interface 706, and/or the communication interface 708 can be in one device or distributed among multiple devices.

Further, the blocks need not correspond to physically distinct components. Blocks can be configured to perform various operations, e.g., by programming a processor or providing appropriate control circuitry, and various blocks might or might not be reconfigurable depending on how an initial configuration is obtained. Embodiments can be realized in a variety of apparatus including electronic devices implemented using a combination of circuitry and software. Electronic devices described herein can be implemented using computing device 700.

Various features described herein, e.g., methods, apparatus, computer-readable media and the like, can be realized using a combination of dedicated components, programmable processors, and/or other programmable devices. Processes described herein can be implemented on the same processor or different processors. Where components are described as being configured to perform certain operations, such configuration can be accomplished, e.g., by designing electronic circuits to perform the operation, by programming programmable electronic circuits (such as microprocessors) to perform the operation, or a combination thereof. Further, while the embodiments described above may make reference to specific hardware and software components, those skilled in the art will appreciate that different combinations of hardware and/or software components may also be used and that particular operations described as being implemented in hardware might be implemented in software or vice versa.

Specific details are given in the above description to provide an understanding of the embodiments. However, it is understood that the embodiments may be practiced without these specific details. In some instances, well-known circuits, processes, algorithms, structures, and techniques may be shown without unnecessary detail in order to avoid obscuring the embodiments.

While the principles of the disclosure have been described above in connection with specific apparatus and methods, it is to be understood that this description is made only by way of example and not as limitation on the scope of the disclosure. Embodiments were chosen and described in order to explain principles and practical applications to enable others skilled in the art to utilize the invention in various embodiments and with various modifications, as are suited to a particular use contemplated. It will be appreciated that the description is intended to cover modifications and equivalents.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc.

A recitation of "a", "an", or "the" is intended to mean "one or more" unless specifically indicated to the contrary. Patents, patent applications, publications, and descriptions mentioned here are incorporated by reference in their entirety for all purposes. None is admitted to be prior art.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to explain the principles of the invention and its practical applications to thereby enable others skilled in the art to utilize the invention in various embodiments and with various modifications as are suited to the particular use contemplated.

What is claimed is:

1. A system for authenticating an identity document, the system comprising:
a mobile device; and
one or more memory devices comprising instructions that, when executed by one or more processors, cause the one or more processors to perform the following steps:
storing cluster information of two or more clusters on the mobile device, wherein the cluster information of the two or more clusters includes format features that correspond to how barcode information is structured;
decoding a barcode, using the mobile device, to generate barcode data, wherein:
the barcode is on an identification card; and
the barcode data comprises payload data and format data;
parsing the barcode, using the mobile device, to identify the format data;
comparing, using the mobile device, the format data to format features of at least one of the two or more clusters, wherein comparing the format data to format features of at least one of the two or more clusters includes comparing the format data to a vector of constraints of at least one of the two or more clusters; and
predicting, using the mobile device, validity of the identification card, based on comparing the format data of the barcode data to format features of at least one of the two or more clusters.

2. The system of claim 1, wherein the instructions, when executed, cause the one or more processors to perform the following steps:
predicting, using the mobile device, that the identification card is invalid based on comparing the format data of the barcode data to format features of at least one of the two or more clusters;
initiating a request to a remote identification verification service by transmitting at least a portion of the barcode data from the mobile device to the remote identification verification service, based on predicting the identification card is invalid;
receiving, at the mobile device, a result from the remote identification verification service; and
authenticating, using the mobile device, the identification card presented based on the result from the remote identification verification service.

3. The system of claim 1, wherein comparing the format data to format features and predicting validity of the identification card are performed on the mobile device, without using an internet connection.

4. The system of claim 1, wherein the instructions, when executed, cause the one or more processors to update cluster information, on the mobile device, after predicting the validity of the identification card.

5. The system of claim 1, wherein each of the two or more clusters correspond to a geographical government jurisdiction and/or a version based on a date of issue.

6. A method for authenticating an identity document, the method comprising:
storing cluster information of two or more clusters on a mobile device, wherein the cluster information of the two or more clusters includes format features that correspond to how barcode information is structured;
decoding a barcode, using the mobile device, to generate barcode data, wherein:
the barcode is on an identification card; and
the barcode data comprises payload data and format data;
parsing the barcode, using the mobile device, to identify the format data;
comparing, using the mobile device, the format data to format features of at least one of the two or more clusters, wherein comparing the format data to format features of at least one of the two or more clusters includes comparing the format data to a vector of constraints of at least one of the two or more clusters; and
predicting, using the mobile device, validity of the identification card, based on comparing the format data of the barcode data to format features of at least one of the two or more clusters.

7. The method of claim 6, comprising:
predicting that the identification card is invalid based on comparing the format data of the barcode data to format features of at least one of the two or more clusters;
initiating a request to a remote identification verification service by transmitting at least a portion of the barcode data to the remote identification verification service, based on predicting the identification card is invalid;
receiving a result from the remote identification verification service; and
authenticating the identification card presented based on the result from the remote identification verification service.

8. The method of claim 7, wherein the portion of the barcode data includes at least some of the payload data.

9. The method of claim 6, wherein comparing the format data to format features and predicting validity of the identification card are performed on the mobile device, without using an internet connection.

10. The method of claim 6, comprising updating cluster information, on the mobile device, after predicting the validity of the identification card.

11. The method of claim 6, wherein the method comprises removing personally-identifiable information from the payload data from the mobile device.

12. The method of claim 6, wherein each of the two or more clusters correspond to a geographical government jurisdiction.

13. The method of claim 6, wherein each of the two or more clusters correspond to a version based on a date of issue.

14. A memory device comprising instructions that, when executed by one or more processors, perform the following steps:
storing cluster information of two or more clusters on a mobile device, wherein the cluster information of the two or more clusters includes format features that correspond to how barcode information is structured;
decoding a barcode, using the mobile device, to generate barcode data, wherein:

the barcode is on an identification card; and the barcode data comprises payload data and format data;

parsing the barcode, using the mobile device, to identify the format data;

comparing, using the mobile device, the format data to format features of at least one of the two or more clusters, wherein comparing the format data to format features of at least one of the two or more clusters includes comparing the format data to a vector of constraints of at least one of the two or more clusters; and predicting, using the mobile device, validity of the identification card, based on comparing the format data of the barcode data to format features of at least one of the two or more clusters.

15. The memory device of claim 14, wherein the instructions, when executed, cause the one or more processors to perform the following steps:

predicting that the identification card is invalid based on comparing the format data of the barcode data to format features of at least one of the two or more clusters;

initiating a request to a remote identification verification service by transmitting at least a portion of the barcode data to the remote identification verification service, based on predicting the identification card is invalid;

receiving a result from the remote identification verification service; and authenticating the identification card presented based on the result from the remote identification verification service.

16. The memory device of claim 14, wherein comparing the format data to format features and predicting validity of the identification card are performed on the mobile device, without using an internet connection.

17. The memory device of claim 14, wherein the instructions, when executed, cause the one or more processors to update cluster information, on the mobile device, after predicting the validity of the identification card.

18. The memory device of claim 14, wherein the instructions, when executed, cause the one or more processors to remove personally-identifiable information from the payload data from the mobile device.

19. The memory device of claim 14, wherein each of the two or more clusters correspond to a geographical government jurisdiction.

20. The memory device of claim 14, wherein each of the two or more clusters correspond to a version based on a date of issue.

* * * * *